US012712649B2

(12) United States Patent
Silverman et al.

(10) Patent No.: US 12,712,649 B2
(45) Date of Patent: Aug. 18, 2026

(54) ULTRA-WIDEBAND INTERFERER DETECTION USING SPECTRAL PROCESSING

(71) Applicant: Cisco Technology, Inc., San Jose, CA (US)

(72) Inventors: Matthew A. Silverman, Shaker Heights, OH (US); Michael B. Delong, Macedonia, OH (US); Ashish Pasha Sheikh, Akron, OH (US)

(73) Assignee: Cisco Technology, Inc., San Jose, CA (US)

(*) Notice: Subject to any disclaimer, the term of this patent is extended or adjusted under 35 U.S.C. 154(b) by 671 days.

(21) Appl. No.: 18/062,322

(22) Filed: Dec. 6, 2022

(65) Prior Publication Data

US 2024/0187115 A1 Jun. 6, 2024

(51) Int. Cl.
*H04B 17/345* (2015.01)

(52) U.S. Cl.
CPC .................................. *H04B 17/345* (2015.01)

(58) Field of Classification Search
None
See application file for complete search history.

(56) References Cited

U.S. PATENT DOCUMENTS

| | | | | |
|---|---|---|---|---|
| 7,995,685 B2 * | 8/2011 | Wang | H04B 1/525 455/41.3 |
| 10,879,946 B1 * | 12/2020 | Shima | H04B 1/123 |
| 2004/0109506 A1 * | 6/2004 | Hinton | H04B 1/719 375/242 |
| 2006/0045219 A1 * | 3/2006 | Wang | G06K 7/0008 375/346 |
| 2006/0171445 A1 * | 8/2006 | Batra | H04W 52/243 375/130 |
| 2007/0133387 A1 * | 6/2007 | Arslan | H04L 27/0004 370/206 |
| 2007/0291636 A1 * | 12/2007 | Rajagopal | H04L 27/0006 370/208 |
| 2009/0147830 A1 * | 6/2009 | Kaiser | H04L 5/0037 375/E1.037 |
| 2009/0180521 A1 * | 7/2009 | Joseph | H04L 5/0007 375/346 |

(Continued)

FOREIGN PATENT DOCUMENTS

| | | | |
|---|---|---|---|
| GB | 2451682 A | 2/2009 | |
| GB | 2457890 A * | 9/2009 | H04B 1/719 |
| WO | WO-2015120628 A1 * | 8/2015 | H04W 74/0816 |

OTHER PUBLICATIONS

Alleven, "UWB Alliance cites "grave concerns" about proposed power levels in 6 GHz band", Wirless, Oct. 15, 2018.

*Primary Examiner* — Christopher T Wyllie
(74) *Attorney, Agent, or Firm* — Patterson + Sheridan, LLP

(57) ABSTRACT

Techniques for identifying ultra-wideband interferers in a wireless communication network are disclosed. These techniques include scanning a plurality of channels relating to a wireless communication network and generating one or more spectrograms based on the scanning. The techniques further include identifying an ultra-wideband interferer for the wireless communication network, using the one or more spectrograms, including: analyzing, using the one or more spectrograms, at least one of: (i) power variations relating one or more channels, (ii) power slopes between one or more pairs of channels, (iii) a power level for one or more channels, (iv) carrier leakage, or (v) a period of pulse transmissions.

17 Claims, 5 Drawing Sheets

(56) References Cited

U.S. PATENT DOCUMENTS

| | | | | |
|---|---|---|---|---|
| 2009/0221256 | A1* | 9/2009 | Sahinoglu | H04B 1/719 455/307 |
| 2010/0232350 | A1* | 9/2010 | Leong | H04B 7/1858 370/317 |
| 2011/0051782 | A1* | 3/2011 | Gupta | H03H 11/1291 375/140 |
| 2011/0085629 | A1* | 4/2011 | Lindoff | H04B 1/71 375/350 |
| 2011/0188544 | A1* | 8/2011 | Ponnuswamy | H04W 16/14 375/136 |
| 2012/0093338 | A1* | 4/2012 | Levi | H04R 3/005 381/92 |
| 2013/0035128 | A1* | 2/2013 | Chan | H04W 72/542 455/515 |
| 2015/0156645 | A1* | 6/2015 | Ponnuswamy | H04W 24/06 370/241 |
| 2018/0146083 | A1* | 5/2018 | Adel | H04W 4/027 |
| 2018/0324595 | A1* | 11/2018 | Shima | H04W 16/10 |
| 2020/0120033 | A1* | 4/2020 | Wolberg | H04W 28/0205 |
| 2020/0228210 | A1* | 7/2020 | Lapierre | G01R 23/20 |
| 2021/0006348 | A1* | 1/2021 | Vlachou | H04L 1/0015 |
| 2021/0076396 | A1 | 3/2021 | Chen et al. | |
| 2022/0141657 | A1 | 5/2022 | Hammerschmidt et al. | |
| 2023/0353309 | A1* | 11/2023 | Raghavan | H04B 17/14 |
| 2024/0129080 | A1* | 4/2024 | Baldi | H04L 9/0618 |
| 2024/0187115 | A1* | 6/2024 | Silverman | H04B 17/318 |
| 2024/0187970 | A1* | 6/2024 | Silverman | H04W 48/08 |
| 2024/0283476 | A1* | 8/2024 | Lezzi | H04B 1/1081 |
| 2024/0324023 | A1* | 9/2024 | Xu | H04J 13/16 |
| 2025/0106841 | A1* | 3/2025 | Shah | H04L 5/0016 |

* cited by examiner

ULTRA-WIDEBAND INTERFERER DETECTION USING SPECTRAL PROCESSING

TECHNICAL FIELD

Embodiments presented in this disclosure generally relate to wireless communication. More specifically, embodiments disclosed herein relate to detecting ultra-wideband interferers in a wireless communication network.

BACKGROUND

The use of 6 GHz spectrum for wireless communication (e.g., for WiFi) gives rise to many new potentially interfering devices. This can include ultra-wideband (UWB) devices (e.g., operating in UWB channel 5). For example, many devices operate using channel 5 to locate UWB tags. If these devices are located near a wireless access point (AP), or another component of a wireless communication network, they can create significant interference and degrade network performance. The UBW interfering devices, however, are very difficult to detect using existing techniques.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
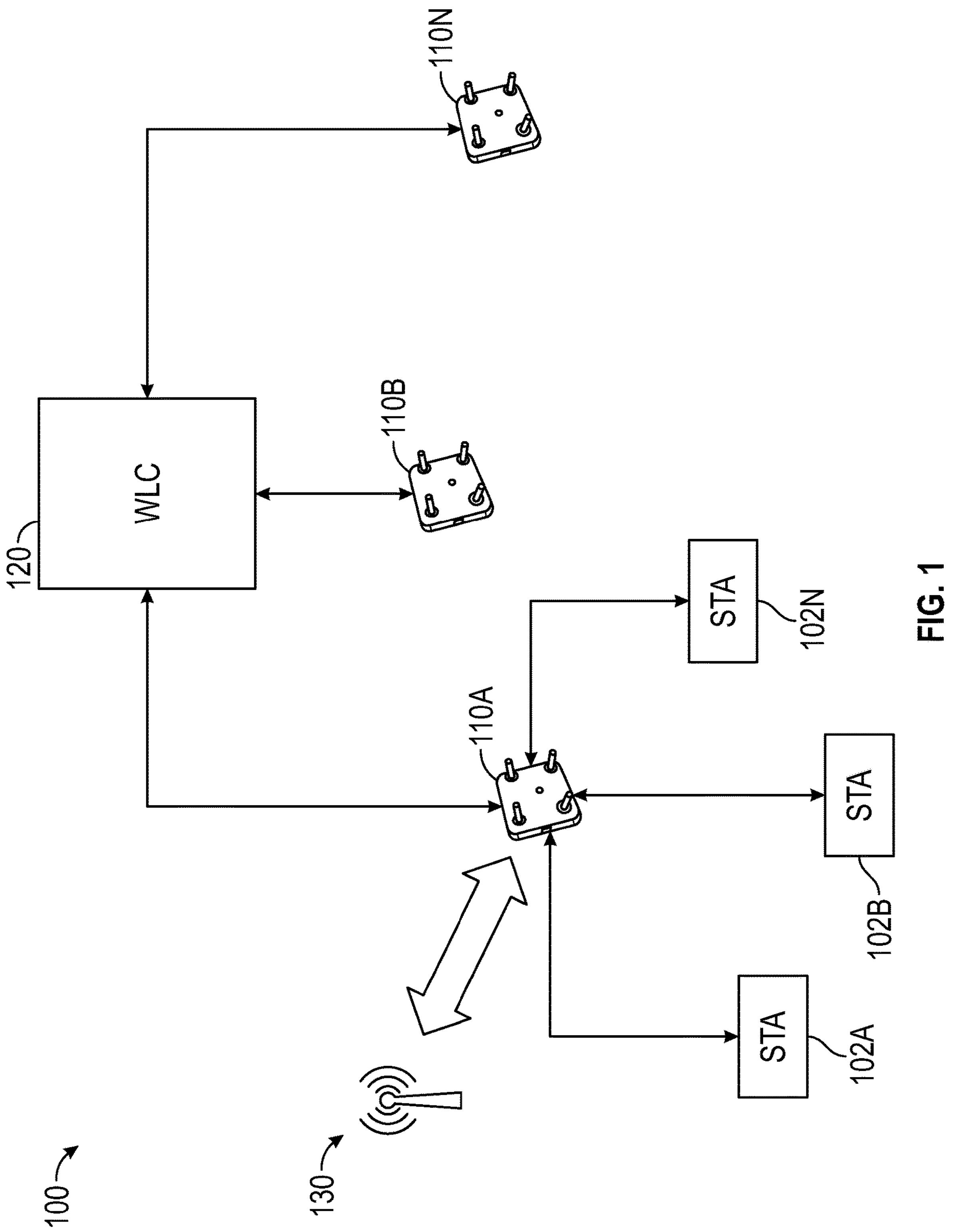
FIG. 1 illustrates a computing environment for UWB interferer detection using spectral processing, according to one embodiment.

Embodiments include a method. The method includes scanning a plurality of channels relating to a wireless communication network. The method further includes generating one or more spectrograms based on the scanning. The method further includes identifying an ultra-wideband interferer for the wireless communication network, using the one or more spectrograms, including: analyzing, using the one or more spectrograms, at least one of: (i) power variations relating one or more channels, (ii) power slopes between one or more pairs of channels, (iii) a power level for one or more channels, (iv) carrier leakage, or (v) a period of pulse transmissions.

Embodiments further include a system, including a processor and a memory having instructions stored thereon which, when executed on the processor, performs operations. The operations include scanning a plurality of channels relating to a wireless communication network. The operations further include generating one or more spectrograms based on the scanning. The operations further include identifying an ultra-wideband interferer for the wireless communication network, using the one or more spectrograms, including: analyzing, using the one or more spectrograms, at least one of: (i) power variations relating one or more channels, (ii) power slopes between one or more pairs of channels, (iii) a power level for one or more channels, (iv) carrier leakage, or (v) a period of pulse transmissions.

Embodiments further include a non-transitory computer-readable medium having instructions stored thereon which, when executed by a processor, performs operations. The operations include scanning a plurality of channels relating to a wireless communication network. The operations further include generating one or more spectrograms based on the scanning. The operations further include identifying an ultra-wideband interferer for the wireless communication network, using the one or more spectrograms, including: analyzing, using the one or more spectrograms, at least one of: (i) power variations relating one or more channels, (ii) power slopes between one or more pairs of channels, (iii) a power level for one or more channels, (iv) carrier leakage, or (v) a period of pulse transmissions.

EXAMPLE EMBODIMENTS

In an embodiment, spectral processing can be used to identify UWB interferers for 6 GHz wireless networks. For example, a monitor radio can be used to scan across all 160 MHz 6 GHz channels, capturing spectrograms describing the wireless radio environment. These spectrograms can include multiple fast Fourier transform (FFT) outputs, over time, spaced at a certain period.

The captured spectrograms can then be used to detect UWB interferers, and the wireless network can be configured to avoid the UWB interferers and improve performance. For example, scanning can be separately done for each 160 MHz channel and the automatic gain control (AGC) gain can be different from one capture to the next.

The captured spectrograms can then be analyzed for the max or average power seen across the spectrograms for each 160 MHz channel. An UWB interferer present on channel 5, for example, will have one or more of the following key characteristics: (1) Flat power across 160 MHz channels 65, 97, 129, (2) A significant increase in power between 160 MHz channel 1 and 160 MHz channel 33, (3) A significant decrease in power between 160 MHz channel 161 and 160 MHz channel 193, (4) Low power in channel 1 and 193, (5) Detectible carrier leakage at 6489 MHz, and (6) a repetitive on period that is a multiple of 1 ms. The presence of these characteristics can indicate that an UWB signal is interfering on channel 5, and the wireless network can be configured to improve performance by avoiding the interferer. For example, a wireless local area network (WLAN) controller (WLC) can configure a WiFi network for a number of APs to avoid the UWB interferer. Channel 5 is merely one example, and one or more of the techniques discussed below can be applied to any suitable band and channel.

FIG. 1 illustrates a computing environment 100 for UWB interferer detection using spectral processing, according to one embodiment. The computing environment 100 includes a WLC 120 associated with a number of APs 110A-N. For example, the WLC 120 can be used to control the APs 110A-N. Each of the APs 110A-N can be respectively associated with one or more wireless stations (STAs) 102A-N. The STAs 102A-N can include any suitable wireless devices, including computers, smartphones, tablets, wearable devices, Internet of Things (IOT) devices, APs, and any other suitable wireless device.

Figure 2:
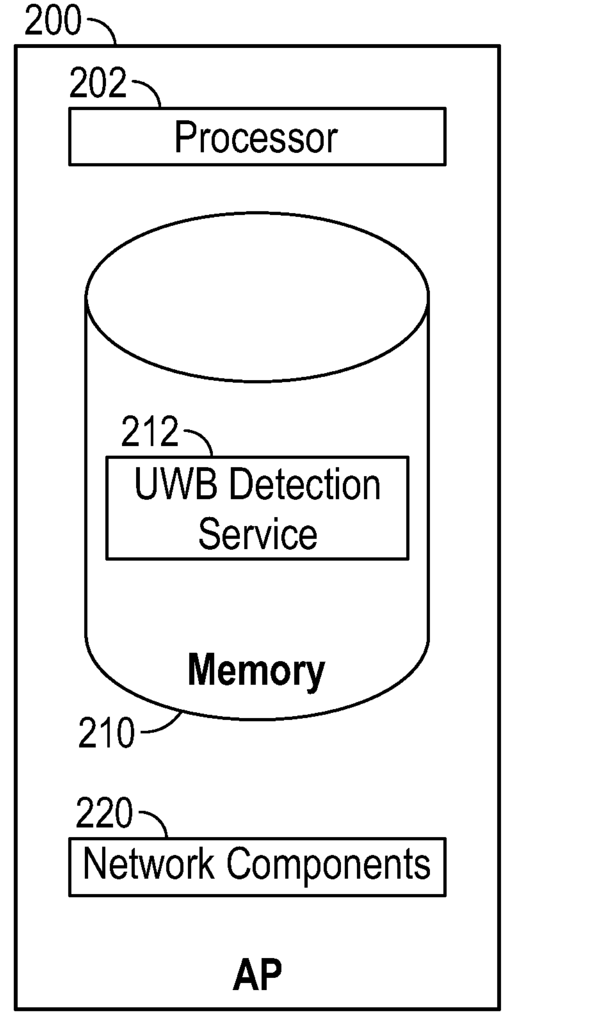
FIG. 2 illustrates an AP and a controller for UWB interferer detection using spectral processing, according to one embodiment.
Figure 2:
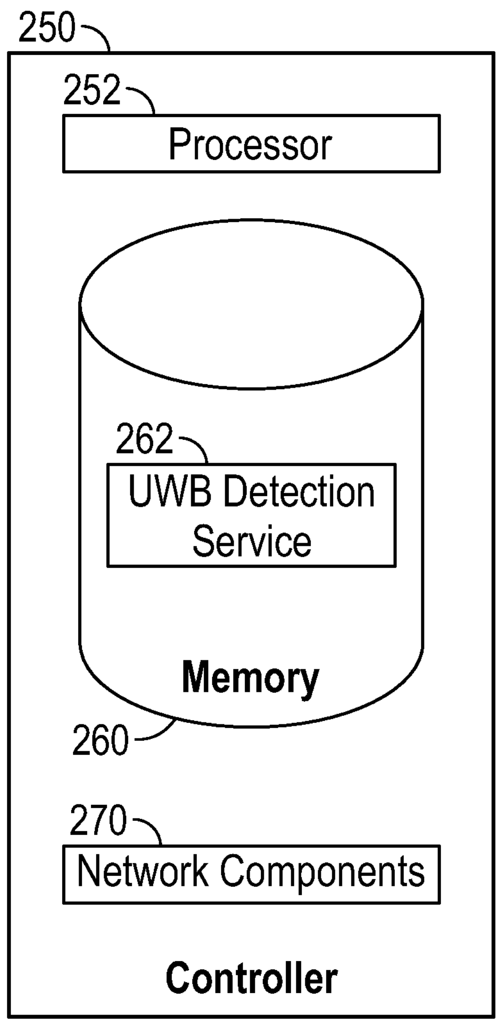

In an embodiment, the computing environment 100 further includes an UWB interferer 130. For example, one or more the APs 110A-N can support a WiFi network using the 6 GHz band. The UWB interferer 130 can transmit using UWB channel 5, creating interference in the 6 GHz band. As discussed further below with regard to FIGS. 3-4, one or more of the APs 110A-N, the WLC 120, or any other suitable component of the computing environment 100 can detect the UWB interferer 130. For example, as illustrated in FIG. 2 below, any of the APs 110A-N, the WLC 120, or both, can include an UWB detection service configured to facilitate detecting UWB interferers using spectral processing. The WLC 120, or another suitable network component, can then configure the wireless communication network to avoid interference with the UWB interferer 130 and improve performance.

In an embodiment, the various components of the computing environment 100 communicate using one or more suitable communication networks, including the Internet, a wide area network, a local area network, or a cellular network, and uses any suitable wired or wireless communication technique (e.g., WiFi or cellular communication). Further, in an embodiment, the WLC 120 can be implemented using any suitable combination of physical compute systems, cloud compute nodes and storage locations, or any other suitable implementation. For example, the WLC 120 could be implemented using a respective server or cluster of servers.

FIG. 2 illustrates an AP and a controller for UWB interferer detection using spectral processing, according to one embodiment. An AP 200 includes a processor 202, a memory 210, and network components 220. In an embodiment, the AP 200 corresponds with any of the APs 110A-N illustrated in FIG. 1. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the AP 200 to interface with a communication network, as discussed above in relation to FIG. 1. For example, the network components 220 can include wired, WiFi, or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the AP 200. The program code is generally described as various functional "applications" or "modules" within the memory 210, although alternate implementations may have different functions and/or combinations of functions. Within the memory 210, the UWB detection service 212 facilitates detecting UWB interferers. This is discussed further, below, with regard to FIGS. 3-5.

The controller 250 includes a processor 252, a memory 260, and network components 270. In an embodiment, the controller 250 corresponds with the WLC 120 illustrated in FIG. 1. Alternatively, the controller 250 corresponds with any other suitable controller in a wireless communication network (e.g., a WiFi network). The processor 252 generally retrieves and executes programming instructions stored in the memory 260. The processor 252 is representative of a single CPU, multiple CPUs, a single CPU having multiple processing cores, graphics processing units (GPUs) having multiple execution paths, and the like.

The network components 270 include the components necessary for the controller 250 to interface with a communication network, as discussed above in relation to FIG. 1. For example, the network components 270 can include wired, WiFi, or cellular network interface components and associated software. Although the memory 260 is shown as a single entity, the memory 260 may include one or more memory devices having blocks of memory associated with physical addresses, such as random access memory (RAM), read only memory (ROM), flash memory, or other types of volatile and/or non-volatile memory.

The memory 260 generally includes program code for performing various functions related to use of the controller 250. The program code is generally described as various functional "applications" or "modules" within the memory 260, although alternate implementations may have different functions and/or combinations of functions. Within the memory 260, the UWB detection service 262 facilitates detecting UWB interferers. This is discussed further, below, with regard to FIGS. 3-5. As illustrated in FIG. 2, any suitable component in a wireless communication network can facilitate detecting UWB interferes, including an AP, a WLC, or any other suitable component.

While the AP 200 and controller 250 are each illustrated as a single entity, in an embodiment, the various components can be implemented using any suitable combination of physical compute systems, cloud compute nodes and storage locations, or any other suitable implementation. For example, the AP 200, the controller 250, or both could be implemented using a server or cluster of servers. As another example, the AP 200, the controller 250, or both, can be implemented using a combination of compute nodes and storage locations in a suitable cloud environment. For example, one or more of the components of the AP 200, the controller 250, or both, can be implemented using a public cloud, a private cloud, a hybrid cloud, or any other suitable implementation.

Although FIG. 2 depicts the UWB detection service 212 as being located in the memory 210 and the UWB detection service 262 as being located in the memory 260, that representation is also merely provided as an illustration for clarity. More generally, the AP 200, the controller 250, or both, or both, may include one or more computing platforms, such as computer servers for example, which may be co-located, or may form an interactively linked but distributed system, such as a cloud-based system, for instance. As a result, the processors 202 and 252, and the memories 210 and 260, may correspond to distributed processor and memory resources within the computing environment 100. Thus, it is to be understood that the UWB detection services 212 and 262 may be stored at any suitable location within the distributed memory resources of the computing environment 100.

Figure 3:
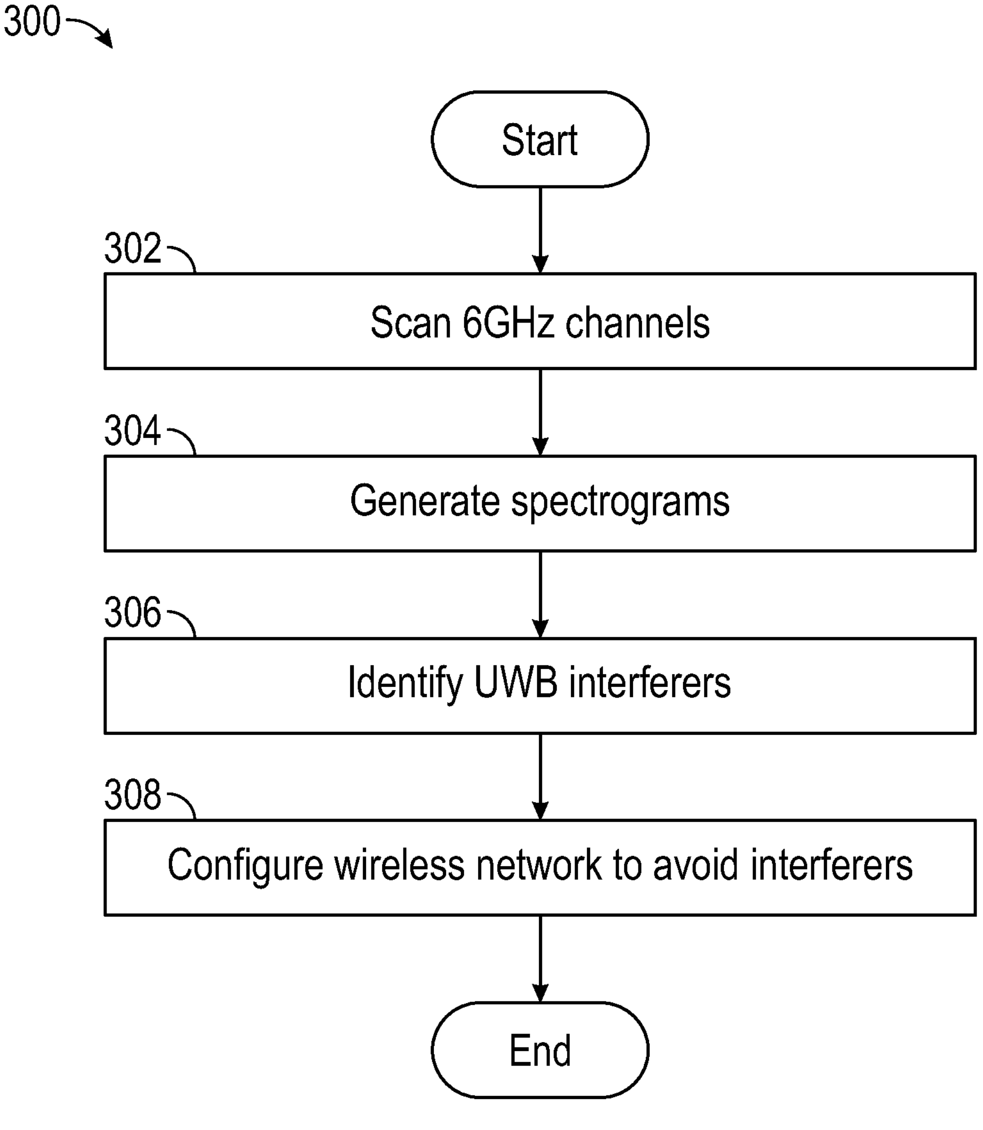
FIG. 3 is a flowchart illustrating UWB interferer detection using spectral processing, according to one embodiment.

FIG. 3 is a flowchart 300 illustrating an interactive third-party enabled interference classification platform, according to one embodiment. At block 302, a UWB detection service (e.g., either, or both, of the UWB detection services 212 or 262 illustrated in FIG. 2) scans 6 GHz channels. In an embodiment, a monitor radio scans across 160 MHz 6 GHz channels (e.g., across all channels). In an embodiment, the monitor radio is incorporated into an AP (e.g., one of the APs 110A-N illustrated in FIG. 1). Alternatively, or in addition, the monitor radio is a stand-alone radio device used to scan 6 GHz channels, or is incorporated into any suitable device in the wireless communication network.

Figure 4:
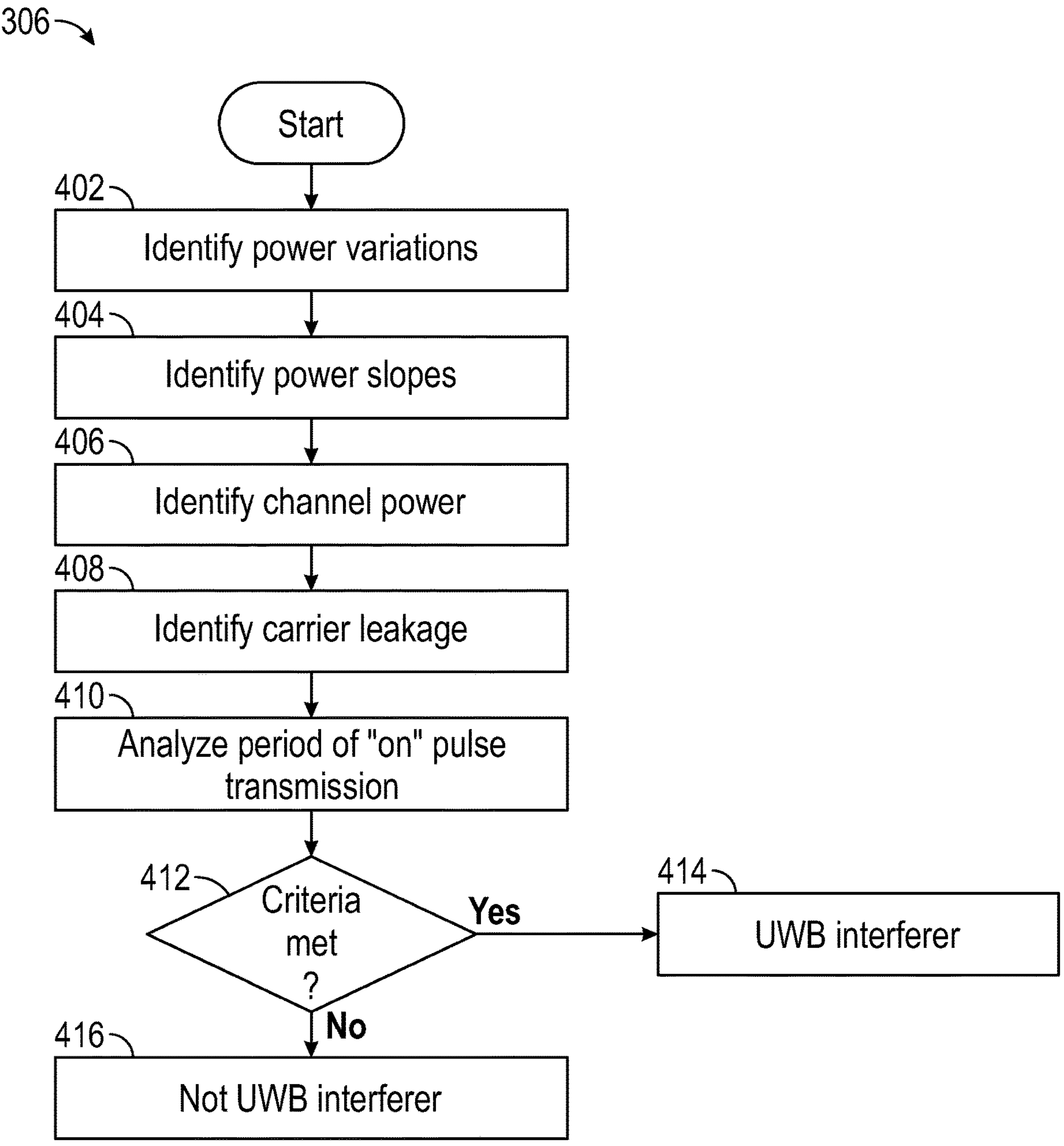
FIG. 4 is a flowchart further illustrating identifying UWB interferers using spectral processing, according to one embodiment.
Figure 5:
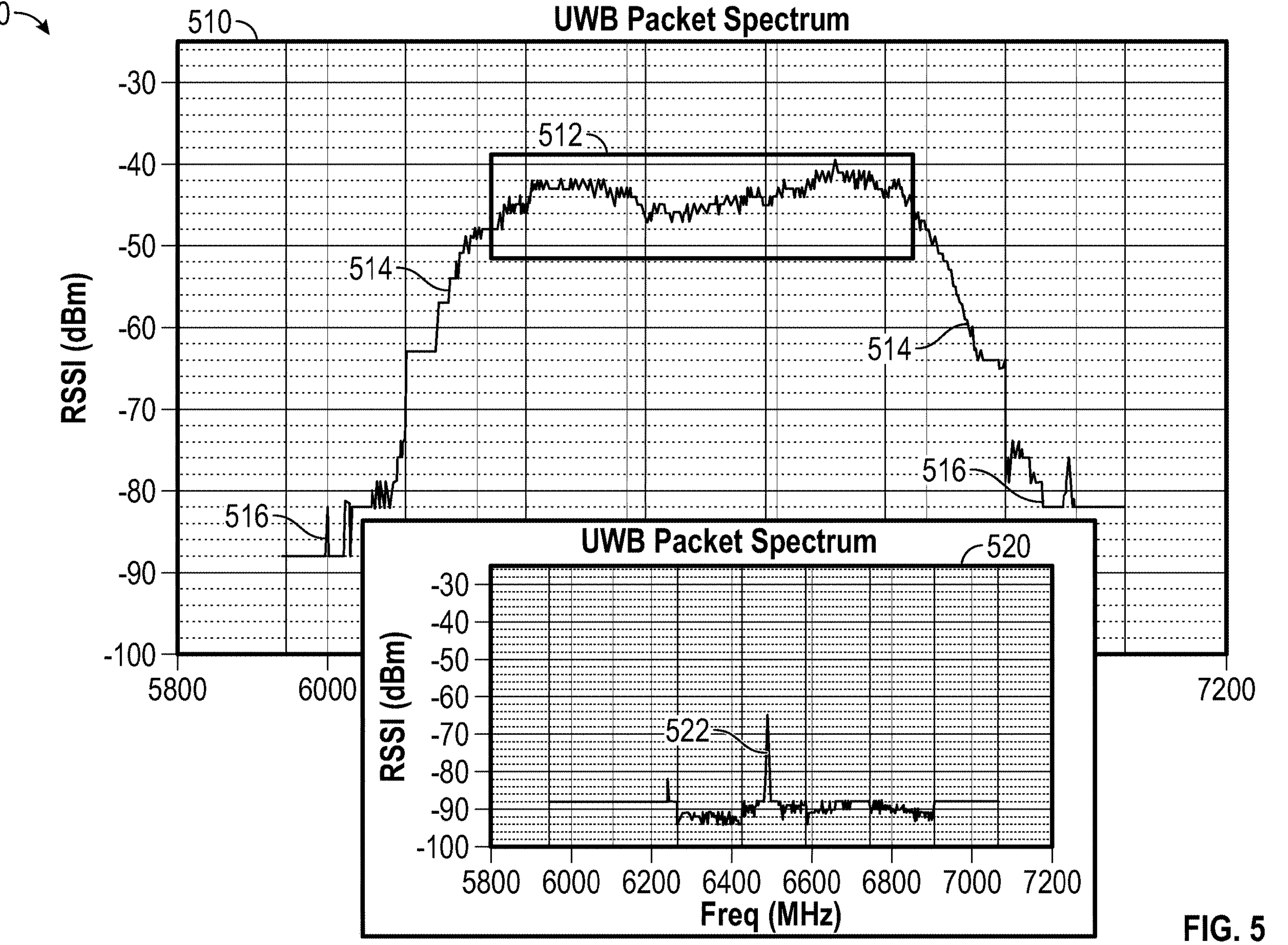
FIG. 5 illustrates an example spectral analysis for an UWB interferer, according to one embodiment.

FIGS. 3-5 illustrate use of 160 MHz channels. But this is merely one example. Alternatively, the UWB detection service can scan across channels of any suitable width (e.g., 80 MHz channels or any other suitable channel width). In an embodiment, the specific detection characteristics (e.g., discussed below with regard to block 306 and FIG. 4) vary based on the channel width.

At block 304, the UWB detection service generates spectrograms. In an embodiment, the spectrograms relate to multiple FFT outputs, over time, spaced at a specified period. FIG. 5, below, illustrates one example of a spectrogram used to identify UWB interferes.

At block 306, the UWB detection service identifies UWB interferers. This is discussed further, below, with regard to FIG. 4. For example, the UWB detection service can identify UWB interferes using one or more key characteristics: (1) power variation (e.g., across 160 MHz channels 65, 97, 129), (2) power slope (e.g., between 160 MHz channel 1 and 160 MHz channel 33 and between 160 MHz channel 161 and 193), (4) total power (e.g., in channel 1 and 193), (5) carrier leakage (e.g., power before the signal turns on at 6489 MHz on FFT samples), and (6) timestamps for the start of on pulses and the period of on transmissions.

At block 308, the UWB detection service configures a wireless network to avoid interferers (e.g., UWB interferers identified at block 306). For example, the UWB detection service can report characteristics of the UWB interferer to a WLC. These characteristics can include channels, duty cycle, severity, or any other suitable characteristics. The WLC, or any other suitable network component, can modify radio operation based on the characteristics. For example, the WLC can instruct APs to stop using the identified channel, or to make using that channel less likely. This is merely an example.

Alternatively, or in addition, the UWB detection service could report the characteristics of the UWB interferer to the STAs (e.g., the STAs 102A-N illustrated in FIG. 1). The STAs can then modify their own operation to improve network performance by avoiding the UWB interferer.

FIG. 4 is a flowchart identifying UWB interferers using spectral processing, according to one embodiment. In an embodiment, FIG. 4 corresponds with block 306 illustrated in FIG. 3. At block 402, a UWB detection service (e.g., either, or both, of the UWB detection services 212 or 262 illustrated in FIG. 2) identifies power variations. In an embodiment, the UWB detection service determines whether a spectrogram reflects flat power across designated channels (e.g., 160 MHz channels 65, 97, and 129). For example, the UWB detection service can determine whether a max-min power across channels 65, 97, and 129 is less than a threshold value. The threshold value can be defined prior to operation (e.g., by a developer), can be defined by a system administrator (e.g., using a suitable user interface), or can be defined dynamically using a suitable technique.

At block 404, the UWB detection service identifies power slopes. In an embodiment, the UWB detection service determines whether there has been a sufficient increase in power between channels (e.g., between 160 MHz channels 1 and 33). Further, the UWB detection service determines whether there has been a sufficient decrease in power between other channels (e.g., between 160 MHz channels 161 and 193). For example, the UWB detection service can determine whether the median slope across 160 MHz channels 1 to 33 exceeds a minimum slope value. As another example, the UWB detection service can determine whether the median slope across channels 161 to 193 is less than a minimum negative slope value.

At block 406, the UWB detection service identifies channel power. In an embodiment, the UWB detection service identifies whether power is low in specific channels (e.g., 160 MHz channels 1 and 193). For example, the UWB detection service can determine whether the median power in channels 1 and 193 is below a threshold maximum power value.

At block 408, the UWB detection service identifies carrier leakage. In an embodiment, the UWB detection service identifies power in FFT samples to identify carrier leakage (e.g., at 6489 MHz). For example, the UWB detection service can determine whether the power at 6489 MHz is greater than the power at other frequencies near 6489 MHz for FFT samples where the power is lower than a specified threshold value.

At block 410, the UWB detection service analyzes the period of on pulse transmissions. In an embodiment, the UWB detection service identifies a repetitive on-period (e.g., that is a multiple of 1 ms). For example, the UWB detection service can identify repetition of FFT samples where the power has a period that is at least a minimum duration and at most a maximum duration.

At block 412, the UWB detection service determines whether criteria have been met. In an embodiment, the UWB detection service determines whether all of the criteria described above for block 402-410 are met. If all criteria are met, the UWB detection service proceeds to block 414 and detects a UWB interferer. If any of the criteria are not met, the UWB detection service proceeds to block 416 and detects that there is not a UWB interferer.

This is merely an example. Alternatively, the UWB detection service can detect a UWB when some, but not all, of the criteria described for block 402-10 are met. For example, one or more of the criteria can be given additional weight compared to other criteria. If a sufficient total weight of criteria is met, the UWB detection service proceeds to block 414 and detects a UWB interferer. If not, the UWB detection service proceeds to block 416 and detects that there is not a UWB interferer.

FIG. 5 illustrates an example spectral analysis 500 for an UWB interferer, according to one embodiment. In an embodiment, the spectral analysis 500 includes a UWB packet spectrum 510 and another UWB packet spectrum 520. The UWB packet spectrums 510 and 520 each illustrated a received signal strength indication (RSSI) across the y-axis and a frequency (e.g., in MHz) across the x-axis. In an embodiment, the UWB packet spectrums 510 and 520 reflect an average (e.g., a median) of time-domain samples. Further, in an embodiment, the UWB packet spectrum 520 reflects samples next to the inter-frame space between UWB pulses. As discussed below, this can be used to identify carrier.

In an embodiment, the signal portion 512 indicates a signal across 500 MHz of bandwidth with a center of 6489

MHz. For example, this can be used to determine power variations for block 402 illustrated in FIG. 4. The signal portions 514 indicate the up and down slopes as a 500 MHz signal at 6489 MHz is approached. For example, this can be used to determine power slopes for block 404 illustrated in FIG. 4.

The signal portions 516 indicate lower power in low and high channels, respectively, accompanied with reduced levels of AGC gain (e.g., indicating that there is off-channel signal). For example, this can be used to determine channel power at block 406 illustrated in FIG. 4. The signal portion 522 indicates carrier leakage at 6489 MHz. For example, this can be used to determine power in FFT samples at block 408 illustrated in FIG. 4.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:

scanning a plurality of 160 megaHertz (MHz) channels relating to a 6 gigaHertz (GHz) band for a wireless communication network;

generating one or more spectrograms based on the scanning; and identifying an ultra-wideband interferer for the wireless communication network, using the one or more spectrograms, comprising:

analyzing, using the one or more spectrograms, a period of pulse transmissions by identifying a repetition of FFT samples with power having a period that is greater than a first threshold value and less than a second threshold value.

2. The method of claim 1, wherein identifying the ultra-wideband interferer for the wireless communication network, using the one or more spectrograms, comprises analyzing, using the one or more spectrograms, at least one of: (i) power variations relating to one or more channels, (ii) power slopes between one or more pairs of channels, (iii) a power level for one or more channels, and (iv) carrier leakage.

3. The method of claim 1, wherein identifying the ultra-wideband interferer for the wireless communication network, using the one or more spectrograms, comprises analyzing, using the one or more spectrograms, at least two of: (i) power variations relating to one or more channels, (ii) power slopes between one or more pairs of channels, (iii) a power level for one or more channels, and (iv) carrier leakage.

4. The method of claim 1, wherein identifying the ultra-wideband interferer for the wireless communication network, using the one or more spectrograms, comprises analyzing, using the one or more spectrograms, at least three of: (i) power variations relating to one or more channels, (ii) power slopes between one or more pairs of channels, (iii) a power level for one or more channels, and (iv) carrier leakage.

5. The method of claim 1, wherein identifying the ultra-wideband interferer for the wireless communication network, using the one or more spectrograms, comprises analyzing, using the one or more spectrograms, all of: (i) power variations relating to one or more channels, (ii) power slopes between one or more pairs of channels, (iii) a power level for one or more channels, and (iv) carrier leakage.

6. The method of claim 1, wherein power variations relating to one or more channels are analyzed, comprising:

determining that a power variation across channels 65, 97, and 129 is less than a threshold value.

7. The method of claim 1, wherein power slopes are analyzed between one or more pairs of channels, comprising:

determining that a slope across channels 1 to 33 exceeds a first threshold value, and determining that a slope across channels 161 to 193 is less than a second threshold value.

8. The method of claim 1, wherein a power level for one or more channels is analyzed, comprising:

determining that a median power in channels 1 and 193 are both below a threshold value.

9. The method of claim 1, wherein carrier leakage is analyzed, comprising:

determining that power at 6489 MHz is greater than power at one or more frequencies other than 6489 MHz for fast Fourier transform (FFT) samples where power is lower than a threshold value.

10. The method of claim 1, further comprising:

configuring the wireless communication network based on the identified ultra-wideband interferer.

11. A system, comprising:

a processor; and a memory having instructions stored thereon which, when executed on the processor, performs operations comprising:

scanning a plurality of channels relating to a wireless communication network;

generating one or more spectrograms based on the scanning; and identifying an ultra-wideband interferer for the wireless communication network, using the one or more spectrograms, comprising:

analyzing, using the one or more spectrograms, at least four of: (i) power variations relating to one or more channels, (ii) power slopes between one or more pairs of channels, (iii) a power level for one or more channels, (iv) carrier leakage, and (v) a period of pulse transmissions.

12. The system of claim 11, wherein scanning the plurality of channels relates to a 6 GHz band for the wireless communication network and comprises scanning 160 Mhz channels, wherein power variations relating to one or more channels are analyzed, comprising:

determining that a power variation across channels 65, 97, and 129 is less than a threshold value, and wherein power slopes are analyzed between one or more pairs of channels, comprising:

determining that a slope across channels 1 to 33 exceeds a first threshold value, and determining that a slope across channels 161 to 193 is less than a second threshold value.

13. The system of claim 11, wherein scanning the plurality of channels relates to a 6 GHz band for the wireless communication network and comprises scanning 160 Mhz channels, wherein a power level for one or more channels is analyzed, comprising:

determining that a median power in channels 1 and 193 are both below a wherein carrier leakage is analyzed, comprising:

determining that power at 6489 MHz is greater than power at one or more frequencies other than 6489 MHz for fast Fourier transform (FFT) samples where power is lower than a threshold value, and wherein a period of pulse transmissions is analyzed, comprising:

identifying a repetition of FFT samples where power has a period that is greater than a first threshold value and less than a second threshold value.

14. A non-transitory computer-readable medium having instructions stored thereon which, when executed by a processor, performs operations comprising:

scanning a plurality of 160 MHz channels relating to a 6 GHz band for a wireless communication network;

generating one or more spectrograms based on the scanning; and identifying an ultra-wideband interferer for the wireless communication network, using the one or more spectrograms, comprising:

analyzing, using the one or more spectrograms, power variations relating to one or more channels by determining that a power variation across channels 65, 97, and 129 is less than a threshold value.

15. The non-transitory computer-readable medium of claim 14, wherein identifying the ultra-wideband interferer for the wireless communication network, using the one or more spectrograms, comprises analyzing, using the one or more spectrograms, all of: (i) power slopes between one or more pairs of channels, (ii) a power level for one or more channels, (iii) carrier leakage, and (iv) a period of pulse transmissions.

16. The non-transitory computer-readable medium of claim 14, wherein power slopes are analyzed between one or more pairs of channels, comprising:

determining that a slope across channels 1 to 33 exceeds a first threshold value, and determining that a slope across channels 161 to 193 is less than a second threshold value.

17. The non-transitory computer-readable medium of claim 14, wherein a power level for one or more channels is analyzed, comprising:

determining that a median power in channels 1 and 193 are both below a wherein carrier leakage is analyzed, comprising:

determining that power at 6489 MHz is greater than power at one or more frequencies other than 6489 MHz for fast Fourier transform (FFT) samples where power is lower than a threshold value, and wherein a period of pulse transmissions is analyzed, comprising:

identifying a repetition of FFT samples where power has a period that is greater than a first threshold value and less than a second threshold value.

* * * * *